April 19, 1949.  T. A. RICH  2,467,856

CONTROL SYSTEM

Filed Oct. 31, 1945

Inventor:
Theodore A. Rich,
by Claude A. Mots
His Attorney.

Patented Apr. 19, 1949

2,467,856

UNITED STATES PATENT OFFICE 2,467,856

CONTROL SYSTEM

Theodore A. Rich, Schenectady, N. Y., assignor to General Electric Company, a corporation of New York Application October 31, 1945, Serial No. 625,898

3 Claims. (Cl. 323—68)

1

My invention relates to control systems, more particularly to control systems for condition indicating or regulating purposes, such as the control of electric furnaces, and has for its object a simple and reliable control means responsive to variations in the resistance of a resistor.

My invention is especially applicable to electric control systems wherein a Wheatstone bridge is utilized, one resistance leg of the bridge being varied in accordance with a changing condition, such as pressure, water level, temperature, etc. In a temperature control system the variable resistance is subjected to the temperature to be controlled and has a substantial temperature coefficient of resistance whereby a voltage varying with the temperature is produced by the bridge and utilized to control the supply of heating energy to the heated device. One disadvantage of the Wheatstone bridge is that the voltage applied to the bridge produces a substantial current in the bridge, including the temperature variable resistance, so that the temperature of the resistance is in part generated by the current in the bridge and, to that extent, the resistance and therefore the control system is not responsive to the temperature of the heated device.

In accordance with my invention, I apply voltage to the bridge periodically for only very short intervals of time, during which time interval the bridge generates a voltage impulse in accordance with the temperature or other condition to be indicated or controlled. This voltage is utilized to carry out a desired indicating or control operation.

Figure 1:
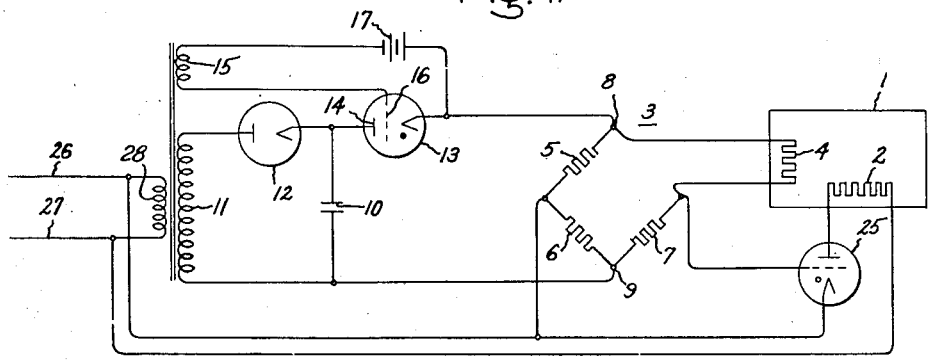
Figure 2:
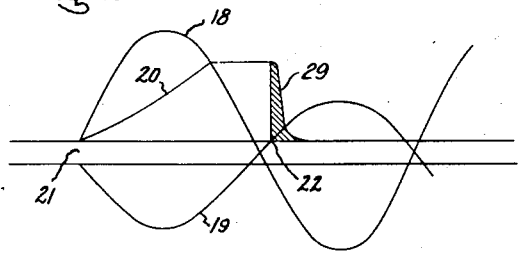
Figure 3:
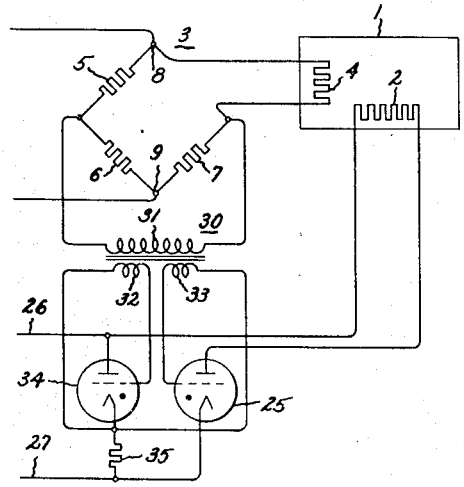
Figure 4:
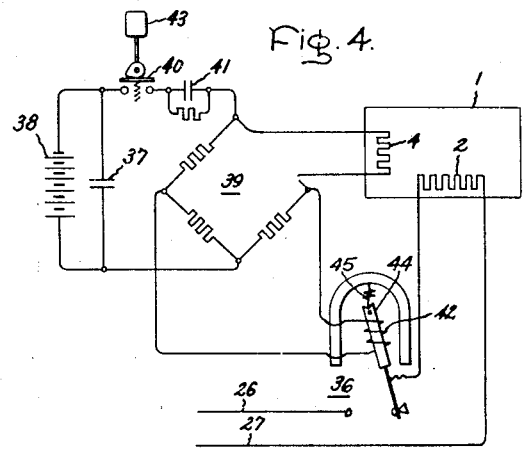

For a more complete understanding of my invention, reference should be had to the accompanying drawing, Fig. 1 of which is a diagrammatic representation of a system of temperature control for an electric furnace embodying my invention, Fig. 2 is a diagram showing various voltage relations in the control system; while Figs. 3 and 4 are diagrammatic representations of modified forms of my invention.

Referring to the drawing, in the control of the temperature of a heated device or furnace 1, heated by an electric heating resistor 2 so as to maintain a predetermined mean temperature in the furnace, I utilize a Wheatstone bridge 3 having a resistance 4 connected in one leg located inside the furnace 1 or in position to be subjected to the temperature of the furnace which is to be maintained substantially constant. The resistance 4 has a substantial temperature coefficient of resistance, preferably a positive temperature coefficient. It may be made, for example, of nickel. The bridge is completed by the resistances 5, 6 and 7 in its remaining three legs, which resistances are not exposed to the temperature of the furnace.

A voltage impulse is applied to the terminals 8 and 9 of the bridge periodically for a very short instant of time, such as .0001 second, by means of a capacitor 10 which is charged each positive half cycle of the alternating voltage across a secondary winding 11 through an electric discharge rectifier device 12, the secondary winding 11 being connected across the terminals of the capacitor 10 through the rectifier 12. For the purpose of connecting the capacitor 10 to the bridge periodically, I provide a three-element gas-filled electric discharge device or thyratron 13 constituting switching means which is connected in series with the capacitor 10 across bridge terminals 8 and 9, the anode 14 of the discharge device being connected to the positive terminal of the capacitor 10. Thus the capacitor, when charged, maintains the anode positive with respect to its cathode.

The capacitor 10 is charged to full voltage during each positive voltage wave of the secondary 11 and for the purpose thereafter of rendering the thyratron 13 conductive I provide a second secondary winding 15 having one terminal connected to the grid 16 of the discharge device 13, this terminal having a polarity opposite to that of the terminal of the secondary 11 which is connected to the anode of the rectifier 12. Therefore, the polarity of the grid 16 is negative during the half cycle that the capacitor 10 is being charged at which time the anode 14 is positive, whereby the device 13 is prevented from becoming conductive while the capacitor is being charged. Also connected in series with the secondary 15 is a negative bias battery 17, the positive terminal of the secondary 15 being connected through the battery 17 to the cathode of the discharge device 13.

The voltage relations existing will be clear from an examination of Fig. 2, in which the curve 18 is a voltage curve of the secondary winding 11, while the curve 19 is a voltage curve of the secondary winding 15. During the positive half cycle of the voltage 18, the capacitor is charged through the rectifier 12, as indicated by the curve 20. Also, it will be noted that the voltage curve 19 is displaced downward with respect to the curve 18 a distance 21, which is the negative bias voltage of the battery 17, whereby the discharge device 13 is prevented from becoming conductive at the beginning of the positive half cycle of the voltage 18.

After the capacitor 10 has been charged it holds its charge while the voltage 18 decreases to zero and goes into its negative half cycle. Soon after the voltage 18 becomes negative, however, the voltage 19 becomes less negative to such an extent that the discharge device 13 becomes conductive. This will occur at substantially the point 22 where the voltage 19 of the grid 16 becomes substantially zero with respect to the capacitor anode voltage 20. The voltage of the capacitor is then applied through conductive device 13 to the bridge. In the event that the bridge is unbalanced, a voltage is produced across the two output terminals of the bridge for the control of the power input to the heating resistor 2. As shown, one output terminal is connected to the grid of a thyratron 25 constituting voltage polarity responsive means, which is connected in series with the heating resistor 2 across the alternating current supply mains 26 and 27, although the thyratron 25 may energize the coil of a contactor in circuit with the resistor 2.

A primary winding 28 connected to the supply mains 26 and 27 is inductively associated with the secondary windings 11 and 15. In a typical control system the voltage of the secondary 11 may be 200 volts, of the secondary 15, 20 volts, and of the battery 17, 5 volts.

In the operation of the system when the furnace temperature is at a predetermined value which is to be maintained, the Wheatstone bridge is balanced and no voltage appears across the bridge when the voltage of the capacitor 10 is applied to the bridge each negative half cycle of the voltage of the secondary 11. If the furnace temperature is below this predetermined temperature a predetermined amount, the voltage across the bridge makes the grid of the thyratron 25 sufficiently positive with respect to its anode to cause the thyratron to become conductive, whereby current is supplied from the mains 26 and 27 through the thyratron to the heating resistor. The thyratron remains conductive for the remaining portion of the positive voltage wave applied to its anode even though the capacitor voltage and the bridge voltage decreases to zero very quickly. Thereafter, the discharge device 25 becomes conductive and supplies current to the resistor 2 each alternating half cycle until the furnace temperature reaches substantially the predetermined temperature when the thyratron becomes nonconductive. In the event that the furnace temperature increases to a value higher than the predetermined temperature to be maintained, the bridge voltage is reversed so that the discharge device 25 does not become conductive.

The capacitor 10 may, in a typical device, have a capacitance of 1 microfarad. When the capacitor is connected across the bridge it discharges very quickly, such as in .0001 second, its relatively small amount of energy being dissipated in the resistances of the bridge, as indicated by the shaded area 29 in Fig. 2. This small amount of energy of the capacitor is not sufficient, however, to heat appreciably the resistances of the bridge and, consequently, the bridge is very accurately responsive to the temperature of the furnace.

In the modified form of my invention shown in Fig. 3 I have provided a transformer 30 connected between the output terminals of the bridge 3 and the thyratron 25, which transformer is often desirable to obtain the polarity sensitive requirements. This transformer has its primary winding 31 connected across the output terminals of the bridge and is provided with two secondary windings 32 and 33. One terminal of the secondary 33 is connected to the grid of the thyratron 25, while the terminal of opposite polarity of the secondary winding 32 is connected to the grid of a smaller thyratron 34 having a resistance 35 of high value in series with it. The opposite terminal of the winding 33 is connected through the resistance 35 to the cathode of the thyratron 25, while the opposite terminal of the winding 32 is connected to the cathode of the thyratron 34.

In this system if the bridge becomes unbalanced so that the thyratron 25 first receives a sufficiently positive voltage applied to its grid it will fire, i. e. become conducting, and the following negative voltage impulse will have no effect on the thyratron 25 although it will fire the thyratron 34.

In the event that the bridge becomes unbalanced so that the thyratron 25 first receives a negative voltage impulse on its grid, the thyratron 25 does not fire but the corresponding positive voltage applied to the grid of the thyratron 34 causes it to fire and produce a voltage drop across the resistance 35 to prevent the thyratron 25 from firing during the following positive impulse produced by the transformer 31. This positive impulse will occur during the half voltage cycle in which the thyratron 34 is conductive.

In Fig. 4 I have shown a simplified arrangement embodying the principles of operation of Fig. 1, but without the use of electric discharge devices. When the discharge devices are used, power is applied to the bridge every voltage cycle although it is applied for only a small fraction of the voltage cycle. In the arrangement of Fig. 4 power may be applied to the bridge not each cycle but at greater intervals, such as every few seconds, which would be satisfactory in some control applications. This method of operation makes possible the use of greater voltages across the bridge with corresponding increase in the bridge voltage output such that the bridge can be utilized to operate directly a polarity sensitive switch 36 for the control of the heater 2. The voltage applied to the bridge for the very short time interval may be increased as desired as long as sufficient time is provided between the applications of voltage to permit the temperature responsive resistance 4 to regain the temperature of its surrounding medium, as shown, the air or gas in the furnace. At the same time the average heat generated in the resistance 4 by the relatively high voltage impulses can be kept below the power rating of the resistance.

As shown in Fig. 4 a capacitor 37 is charged by a suitable battery 38 and the capacitor 37 is connected across the bridge 39 by the closure of a switch 40. When the switch 40 is closed the condenser supplies a high current momentarily with a high voltage drop across the bridge which charges a capacitor 41 up to the potential of the battery 38. In the short interval of time during which this voltage impulse takes place sufficient energy is transferred by the bridge, in the event of a voltage unbalance across the bridge, to the operating coil 42 of the switch 36 to cause operation of the relay. As shown, the switch 40 can be closed intermittently, as desired, by means of an electric motor 43. While the switch 40 is open the capacitor 41 discharges through a resistance connected across it.

The pivoted armature 44 of the switch 36 is provided with suitable means for holding it in each position, such as an overcenter compression spring 45. When the armature is moved clockwise to close the circuit to the heater 2, the armature is held in that position by the spring 45 until it is moved to its open circuit position shown by a voltage impulse of the opposite polarity. It will be observed that the armature 44 gives an indication by its position of the resistivity condition of the heater 2 and the temperature of the furnace.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. In a system of control, a Wheatstone bridge having a variable resistance in one leg, a capacitor, supply connections for supplying an alternating voltage, rectifier means for connecting said supply connections to said capacitor thereby to charge said capacitor during alternate half waves of said supply voltage, and switching means for connecting said capacitor across said bridge during the other alternate half waves of said supply voltage thereby to cause said bridge to produce a voltage impulse varying in value and polarity with the value of said variable resistance, and voltage impulse and polarity responsive control means connected to said bridge.

2. In a system of control, a Wheatsone bridge having a variable resistance in one leg, a three-element electric discharge device provided with an anode, a cathode, and a grid, connections connecting said cathode to one terminal of said bridge, a capacitor, connections connecting said anode through said capacitor to the other terminal of said bridge, electric supply means for periodically charging said capacitor, electric supply means for periodically making said grid positive after said capacitor is charged so that said discharge device becomes conductive to connect said capacitor across said bridge thereby to cause said bridge to produce a voltage impulse varying in value and polarity with the value of said variable resistance, and voltage impulse and polarity responsive control means connected to said bridge.

3. In a system of control, a Wheatstone bridge having a variable resistance in one leg, a three-element electric discharge device provided with an anode, a cathode, and a grid, connections connecting said cathode to one terminal of said Wheatstone bridge, a capacitor, connections connecting said anode through said capacitor to the other terminal of said Wheatstone bridge, a rectifier, a source of alternating current connected through said rectifier across said capacitor for charging said capacitor each positive half cycle of the alternating voltage so that said capacitor maintains said anode positive, a second source of alternating current voltage, connections connecting said second source to said grid and cathode so that said discharge device becomes conductive to connect said capacitor across said bridge after said capacitor has been charged, and impulse and voltage polarity responsive control means connected to said bridge.

THEODORE A. RICH

REFERENCES CITED

The following references are of record in the file of this patent:

UNITED STATES PATENTS

| Number | Name | Date |
| --- | --- | --- |
| 1,694,264 | Hull | Dec. 4, 1928 |
| 1,795,753 | Bonn | Mar. 10, 1931 |
| 2,209,883 | Gohorel | July 30, 1940 |
| 2,365,706 | Keinath | Dec. 26, 1944 |
| 2,381,009 | Siderman | Aug. 7, 1945 |
| 2,407,361 | Wilson | Sept. 10, 1946 |
| 2,427,180 | Ballard | Sept. 9, 1947 |

Certificate of Correction

Patent No. 2,467,856.                                    April 19, 1949.

THEODORE A. RICH

It is hereby certified that error appears in the printed specification of the above numbered patent requiring correction as follows:

Column 6, line 26, claim 3, for the words "impulse and voltage polarity" read *voltage impulse and polarity*;

and that the said Letters Patent should be read with this correction therein that the same may conform to the record of the case in the Patent Office.

Signed and sealed this 25th day of October, A. D. 1949.

[SEAL]

THOMAS F. MURPHY,
*Assistant Commissioner of Patents.*